(12) United States Patent
Lee et al.

(10) Patent No.: US 11,411,420 B2
(45) Date of Patent: Aug. 9, 2022

(54) METHODS AND SYSTEMS FOR GROUP-BASED ENERGY HARVESTING

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Kyoung Min Kim, Seoul (KR); Ce Zhou, East Lansing, MI (US)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 362 days.

(21) Appl. No.: 16/585,045

(22) Filed: Sep. 27, 2019

(65) Prior Publication Data

US 2020/0106292 A1 Apr. 2, 2020

(30) Foreign Application Priority Data

Sep. 27, 2018 (KR) .......... 10-2018-0115005

(51) Int. Cl.
*H02J 50/80* (2016.01)
*H02J 7/00* (2006.01)
*H02J 50/40* (2016.01)

(52) U.S. Cl.
CPC .......... *H02J 7/0071* (2020.01); *H02J 7/0027* (2013.01); *H02J 50/40* (2016.02); *H02J 50/80* (2016.02)

(58) Field of Classification Search
CPC .................................................. H02J 50/80
USPC ........................................................ 320/108
See application file for complete search history.

(56) References Cited

U.S. PATENT DOCUMENTS

| 9,936,451 | B2* | 4/2018 | Zhu | H04W 52/0274 |
|---|---|---|---|---|
| 2010/0253281 | A1* | 10/2010 | Li | H02J 50/12 |
| | | | | 320/108 |
| 2013/0115992 | A1* | 5/2013 | Pantelidou | H04W 52/0235 |
| | | | | 455/517 |
| 2015/0171931 | A1* | 6/2015 | Won | H02J 7/025 |
| | | | | 320/108 |
| 2016/0374016 | A1 | 12/2016 | Zhu et al. | |

(Continued)

FOREIGN PATENT DOCUMENTS

| KR | 10-2012-0005484 A | 1/2012 |
|---|---|---|
| KR | 10-2016-0149992 A | 12/2016 |
| KR | 10-2018-0000290 A | 1/2018 |

OTHER PUBLICATIONS

Zhou, Ce et al., "A Group-Based Energy Harvesting MAC Protocol with AP Scheduling in Machine-to-Machine Networks", *Proceedings of the 12th International Conference on Ubiquitous Information Management and Communication*. ACM, 2018 (7 pages in English).

(Continued)

*Primary Examiner* — Edward Tso
*Assistant Examiner* — Ahmed H Omar
(74) *Attorney, Agent, or Firm* — NSIP Law

(57) ABSTRACT

Provided is a method and system for group-based energy harvesting. The group-based energy harvesting method performed by an access point in an energy harvesting system includes allocating an access period in each group including at least one station, receiving an energy state from the station in the group corresponding to the allocated access period, and scheduling stations in each group as a data transmission station or an energy reception station based on the received energy state.

20 Claims, 18 Drawing Sheets

(56) References Cited

U.S. PATENT DOCUMENTS

| | | | |
|---|---|---|---|
| 2017/0006606 A1* | 1/2017 | Matsuo | H04W 72/0446 |
| 2017/0339680 A1* | 11/2017 | Jia | H04W 28/02 |
| 2018/0042022 A1* | 2/2018 | Tsao | H04W 72/042 |
| 2019/0356177 A1* | 11/2019 | Swan | H02J 7/025 |

OTHER PUBLICATIONS

Korean Office Action dated Jan. 20, 2020 in the corresponding Korean Patent Application No. 10-2018-0115005. p. 1-7 (7 pages in Korean).

* cited by examiner

FIG. 15

| Parameters | Value |
| --- | --- |
| CWmin | 31 |
| CWmax | 255 |
| Packet Payload | 8148 bits |
| MAC Header | 272 bits |
| PHY Header | 128 bits |
| PS-Poll Frame Size | 288 bits |
| ACK Frame Size | 240 bits |
| Slot Duration | 28 μs |
| Propagation Delay | 1 μs |
| SIFS | 28 μs |
| DIFS | 128 μs |
| ACK Timeout | 300 μs |
| Channel Rate | 1 Mbps |
| Beacon Message Size | 200 bits |
| AP Scheduling Frarne Size | 200 bits |
| Battery Capacity | 1 J |
| TX Power | 100 mW |
| RX Power | 60 mW |
| Beamforming power | 500 mW |

METHODS AND SYSTEMS FOR GROUP-BASED ENERGY HARVESTING

CROSS-REFERENCE TO RELATED APPLICATIONS

This application claims priority to Korean Patent Application No. 10-2018-0115005 filed on Sep. 27, 2018 in The Republic of Korea, the entire contents of which are hereby incorporated by reference in their entirety.

BACKGROUND

1. Technical Field

The present disclosure relates to wireless power transmission and, more particularly, to a methods and systems for Group-Based Energy Harvesting.

2. Description of Related Art

In a network including Machine-to-Machine (M2M) terminals, which are core elements of Internet-of-Things (IoT), a lot of terminals operating autonomously with broad communication range performs communications. In the case that Carrier Sense Multiple Access with Collision Avoidance CSMA/CA protocol of the conventional Distributed Contention Function (DCF) scheme is used in a high density M2M network, there is a restriction in communications owing to many collisions between the terminal and a base station. In addition, since the battery capacity of the terminal is restrictive, the battery needs to be replaced when a lot of terminals are deployed, which costs high. Accordingly, to increase throughput and ensure long life of the network, persistent energy should be supplied while contentions of many terminal are alleviated.

The conventional terminal having Energy harvesting function may harvest energy from various external energy resources including solar, wind, kinetic energy, thermal energy, and the like. The harvested energy is converted to electric energy and directly used by the terminal or stored in a capacitor. Thus, a wireless sensor network may prolong the restrictive battery life of the terminal through Energy harvesting. However, since Energy harvesting through external energy is unavailable to control and predict an amount of Energy harvesting, it is hard to fulfill Quality of Service (QoS) requirements in a specific situation. Accordingly, to overcome the restriction of the conventional scheme of harvesting energy from external energy source and transfer energy in relatively fast and stable manner, the Energy harvesting technique utilizing a Radio Frequency (RF) signal has been researched.

However, in the RF Energy harvesting, since an RF energy signal and a data signal of the terminal may be transmitted through an identical channel, interference may occur between data transmission and an RF signal. To solve the problem, a research has been studied to minimize interference that the RF signal influences on the data signal using the beamforming technique when a Power beacon (PB) transmits energy. Through this, a research is needed to increase data throughput and energy harvesting rate by performing energy harvesting process and data transmission/reception process simultaneously. The transmission of energy to the terminal utilizing the beamforming technique may harvest energy in a short time in comparison with the conventional energy harvesting method. Accordingly, a plurality of terminals may access to a channel by utilizing energy in an M2M network, which increases transmission chances. However, this may cause a network congestion situation.

IEEE 802.11 ah is a wireless communication standard designed to fulfill the requirements of the M2M communication by which a plurality of terminals may perform a communication while consuming small energy in an extended communication range. IEEE 802.11ah standard proposes Medium Access Control (MAC) protocol for which an Access Point (AP) performs a communication by dividing terminals into a group. To perform a group-based communication, the AP configures a Restricted Access Window (RAW) in which terminals of each group may perform a contention during a specific time slot. Terminals of each group may access a channel by performing contentions only in a predetermined RAW but may be unable to perform a transmission in another RAW slot. IEEE 802.11ah standard proposes a Target Wakeup Time (TWT) in which the terminal is switched to a Sleep mode and saves energy outside of the corresponding RAW period.

However, in IEEE 802.11ah standard, since a position of terminal is not considered, it is still likely that a collision occurs between data transmissions in a network including a plurality of M2M terminals. In addition, a range of RF energy transmission is restrictive. Owing to interference problem with data signals, it is hard to apply RF energy harvesting technique to the corresponding protocol.

SUMMARY

Exemplary embodiments of the present disclosure is to provide a group-based energy harvesting method and system, which can schedule a data transmission terminal and an energy reception terminal based on the energy state received through a contention between terminals in each group in an allocated access period and receive energy or transmit data according to the scheduling result in a transmission/reception period, and accordingly, energy can be persistently received without decreasing data transmission throughput.

Exemplary embodiments of the present disclosure is also to provide a group-based energy harvesting method and system, in which a communication is performed by dividing terminals into a group in a high density M2M network, that performs a data transmission process to an access point with an RF energy harvesting process from a power beacon (PB) transmitting energy through the beamforming technique simultaneously, and accordingly, energy can be persistently received without decreasing data transmission throughput.

According to one example embodiment of the present disclosure, it is provided a group-based energy harvesting method performed by an access point in an energy harvesting system including allocating an access period in each group including at least one station; receiving an energy state from a station in the group corresponding to the allocated access period; and scheduling the at least one station in each group as a data transmission station or an energy reception station based on the received energy state.

The method may further include receiving data from a data transmission station of any one group in a transmission/reception period after the allocated access period.

The step of scheduling stations may include scheduling a station which has the highest energy as the data transmission station based on the received energy state.

The method may further include transmitting a scheduling order of stations of each group to stations of each group and a power beacon.

The step of transmitting a scheduling order may include including a group identity in a data transmission order field of a scheduling frame and informing the data transmission order to the stations of each group and the power beacon.

An average period of a beacon frame broadcasted by the access point may be a sum of a duration of the access period and a duration of a transmission/reception period.

The method may further include transmitting an acknowledgement response message with an address of station of each group and an address of the power beacon of each group being included to the stations of each group.

According to another example embodiment of the present disclosure, it is provided a group-based energy harvesting method performed by a power beacon in an energy harvesting system including receiving a scheduling result for a station in a group from an access point; and transmitting energy to an energy reception station determined according to the scheduling result in a transmission/reception period after an access period allocated by the access point.

The method may further include waiting for an energy transmission during a data transmission of a data transmission station in the group in which the power beacon is located.

The step of transmitting energy may include transmitting energy to the energy reception station using beamforming based on a position of the energy reception station.

According to another example embodiment of the present disclosure, it is provided a group-based energy harvesting method performed by a station in an energy harvesting system including transmitting an energy state of the station to an access point in an access period; receiving a scheduling result for the station from the access point; and receiving energy from the power beacon of a group or transmitting data to the access point according to a scheduling result in a transmission/reception period after the access period.

The step of transmitting energy state may include transmitting the energy state and beacon information of the power beacon in the corresponding group through a contention between stations of the group in the access period.

The method may further include, when a channel access is failed in the contention between stations of each group corresponding to the access period, being switched to a sleep mode until a next beacon frame is received.

The number of stations that succeeds in the contention between stations may be restricted to the number of entire groups or less.

The method may further include being switched to a sleep mode while the contention between stations of different groups is performed.

A data transmission time for transmitting by a data transmission station and an energy reception time for receiving by an energy reception station may be identically configured in the transmission/reception period.

The step of transmitting data may include, when the station is determined to be the data transmission station in the transmission/reception period, transmitting data to the access point according to a group identity order indicated in a data transmission order field.

According to another example embodiment of the present disclosure, it is provided an access point in an energy harvesting system including a memory configured to store data; a transmission/reception unit configured to transmit/receive a wireless signal; and a processor connected to the memory and the transmission/reception unit, wherein the processor is configured to: allocate an access period in each group including at least one station; receive an energy state from a station in the group corresponding to the allocated access period; and schedule the at least one station in each group as a data transmission station or an energy reception station based on the received energy state.

The processor may receive data from a data transmission station of any one group in a transmission/reception period after the allocated access period.

The processor may schedule a station which has the highest energy as the data transmission station based on the received energy state.

The processor may transmit a scheduling order of stations of each group to stations of each group and a power beacon.

The processor may include a group identity in a data transmission order field of a scheduling frame and inform the data transmission order to the stations of each group and the power beacon.

An average period of a beacon frame broadcasted by the access point may be a sum of a duration of the access period and a duration of a transmission/reception period.

The processor may transmit an acknowledgement response message with an address of station of each group and an address of the power beacon of each group being included to the stations of each group.

According to another example embodiment of the present disclosure, it is provided a power beacon in an energy harvesting system including a memory configured to store data; a transmission/reception unit configured to transmit/receive a wireless signal; and a processor connected to the memory and the transmission/reception unit, wherein the processor is configured to: receive a scheduling result for a station in a group from an access point; and transmit energy to an energy reception station determined according to the scheduling result in a transmission/reception period after an access period allocated by the access point.

The processor may wait for an energy transmission during a data transmission of a data transmission station in the group in which the power beacon is located.

The processor may transmit energy to the energy reception station using beamforming based on a position of the energy reception station.

According to another example embodiment of the present disclosure, it is provided a station in an energy harvesting system including a memory configured to store data; a transmission/reception unit configured to transmit/receive a wireless signal; and a processor connected to the memory and the transmission/reception unit, wherein the processor is configured to: transmit an energy state of the station to an access point in an access period; receive a scheduling result for the station from the access point; and receive energy from the power beacon of a group or transmit data to the access point according to a scheduling result in a transmission/reception period after the access period.

The processor may transmit the energy state and beacon information of the power beacon in the corresponding group through a contention between stations of the group in the access period.

The processor may be switched to a sleep mode until a next beacon frame is received when a channel access is failed in the contention between stations of each group corresponding to the access period.

The number of stations that succeeds in the contention between stations may be restricted to the number of entire groups or less.

The processor may be switched to a sleep mode while the contention between stations of different groups is performed.

A data transmission time for transmitting by a data transmission station and an energy reception time for receiving by an energy reception station may be identically configured in the transmission/reception period.

The processor may transmit data to the access point according to a group identity order indicated in a data transmission order field, when the station is determined to be the data transmission station in the transmission/reception period.

According to exemplary embodiments of the present disclosure, it is available to schedule a data transmission terminal and an energy reception terminal based on the energy state received through a contention between terminals in each group in an allocated access period and receive energy or transmit data according to the scheduling result in a transmission/reception period, and accordingly, energy can be persistently received without decreasing data transmission throughput.

According to exemplary embodiments of the present disclosure, a communication is performed by dividing terminals into a group in a high density M2M network, that performs a data transmission process to an access point with an RF energy harvesting process from a power beacon (PB) transmitting energy through the beamforming technique simultaneously, and accordingly, energy can be persistently received without decreasing data transmission throughput.

According to exemplary embodiments of the present disclosure, GSMAC protocol in which a station in short of energy receives energy through a group-based contention and a station having enough energy transmits data is used, collision occurred when multiple stations access a channel is decreased and energy is received through beamforming technique, and accordingly, data throughput and performance related to delay time and energy can be improved.

In addition, according to exemplary embodiments of the present disclosure, the number of groups is adjusted according to a communication environment and a communication is performed, a network performance can be optimized.

BRIEF DESCRIPTION OF THE DRAWINGS

FIG. 15 is a diagram for describing a simulation parameter used for simulating an energy harvesting system according to an embodiment of the present disclosure.

DETAILED DESCRIPTION OF EXAMPLE EMBODIMENTS OF THE INVENTION

Figure 1:
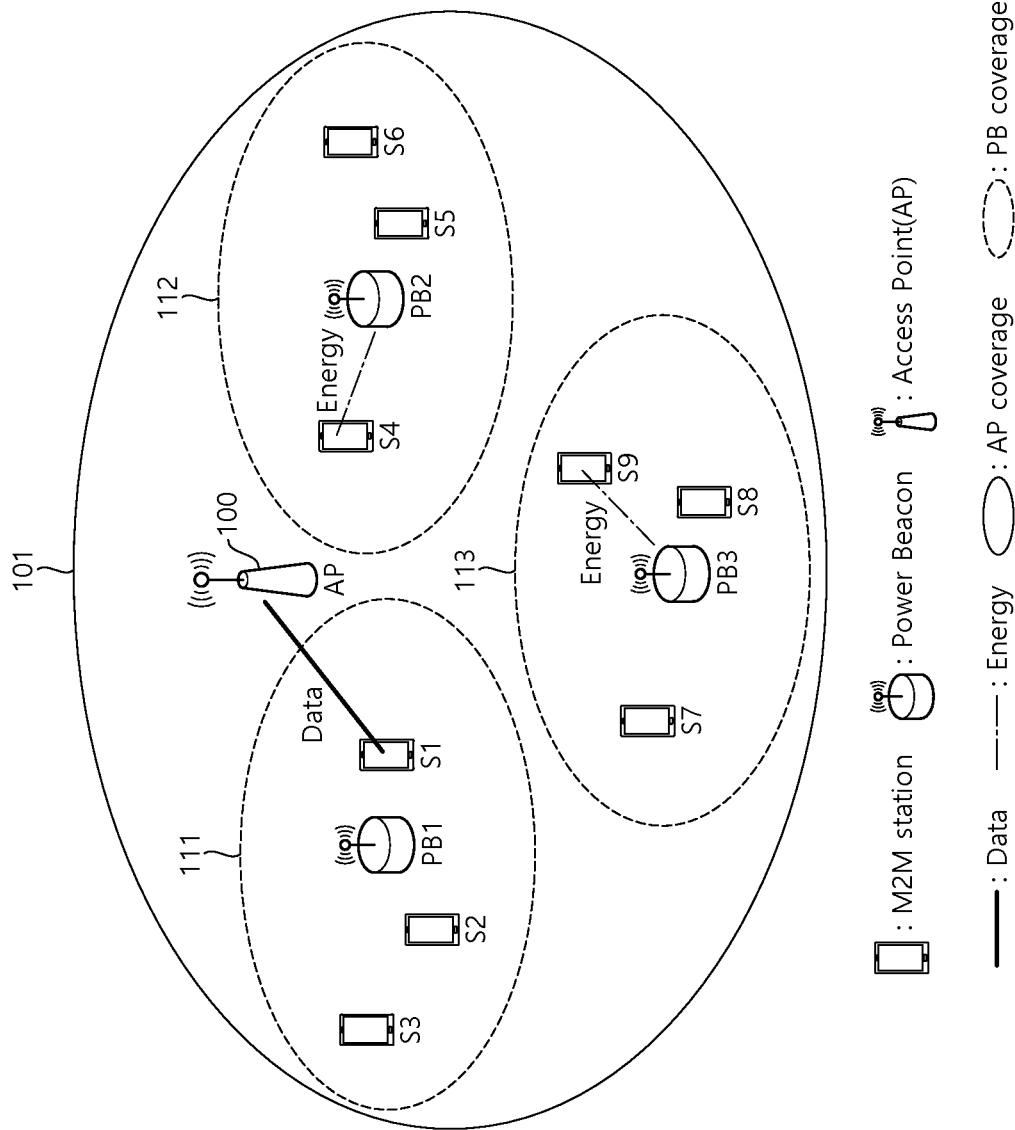
FIG. 1 is a diagram for describing a configuration in which a group-based energy harvesting system is applied according to an embodiment of the present disclosure.

The present disclosure may have various modifications and various embodiments and specific embodiments will be illustrated in the drawings and described in detail in the detailed description.

However, this does not limit the present disclosure to specific embodiments, and it is understood that the present disclosure covers all the modifications, equivalents and replacements included within the idea and technical scope of the present disclosure.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

When it is described that a component is "connected to" or "accesses" another component, the component may be directly connected to or access the other component, or a third component may be present there between. In contrast, it is understood that, when it is described that an element is "directly connected to" or "directly access" another element, it is understood that no element is present between the element and another element.

Terms used in the present application are used only to describe specific embodiments and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art and are not interpreted as an ideal meaning or excessively formal meanings unless clearly defined in the present application.

Hereinafter, preferred embodiments of the present disclosure will be described in detail with reference to the accompanying drawings and in describing the preferred embodiments with reference to the accompanying drawings, the same reference numeral will refer to the same or corresponding component regardless of the reference numeral and a duplicated description thereof will be omitted.

FIG. 1 is a diagram for describing a configuration in which a group-based energy harvesting system is applied according to an embodiment of the present disclosure.

As shown in FIG. 1, the group-based energy harvesting system according to an embodiment of the present disclosure includes an Access Point (AP), a Power Beacon (PB) and a station. However, not all constituent elements shown in the drawing are essential elements. The group-based energy harvesting system may be implemented by more constituent elements than the constituent elements shown in the drawing, or the group-based energy harvesting system may be implemented by less constituent elements than the constituent elements shown in the drawing.

The group-based energy harvesting system according to an embodiment of the present disclosure uses Group-Scheduled Medium Access Control (GSMAC) protocol in the M2M network in which the Power Beacon (PB) transfers energy to a station by utilizing the beamforming technique. According to an embodiment of the present disclosure, data of the station that accesses a channel is transmitted in each group and managed. More particularly, the Access Point (AP) configures Restricted Access Windows (RAWs) as much as the number of groups. The stations in each group perform a contention for data transmission in the RAW which is allocated for the corresponding group. Among the stations that access a channel through a group contention after the RAW period, the station which has the highest energy transmits data. The remaining stations receive energy, and accordingly, energy harvesting rate may be increased while data throughput is increased.

Hereinafter, detailed configuration and operation of each constituent element of the group-based energy harvesting system shown in FIG. 1 are described.

In the network to which an embodiment of the present disclosure is applied, the AP 100 may be located in a center. To provide RF energy to the station, the PB may be uniformly disposed in the network. The station may include many Machine-to-Machine (M2M) stations. FIG. 1 shows a configuration example of the network to which an embodiment of the present disclosure is applied. The large circle 101 depicted in a solid line shows a communication range of the AP, and the stations in the circle may perform communication with the AP. The small circles 111, 112 and 113 depicted in a dotted line show communication ranges of PB1, PB2 and PB3, respectively, and the stations in the circles operate as a group. It is configured such that the stations S1, S2 and S3 are belonged to group 1, stations S4, S5 and S6 are belonged to group 2, and stations S7, S8 and S9 are belonged to group 3. To notify a start of communication, the AP 100 transmits a Beacon frame to all stations including the PB and notifies the Restricted Access Window (RAW) in which each group is going to perform a contention. After Distributed interframe Space (DIFS), the stations located in group 1 performs a contention to access a channel. On the contrary, the stations in the remaining group are switched to a sleep mode.

An embodiment of the present disclosure is related to a new MAC protocol which is designed such that performing RF energy reception and data transmission based on IEEE 802.11ah are available simultaneously. To perform the corresponding process in the MAC protocol according to an embodiment of the present disclosure, a communication period may be divided into an access period in which each period performs a contention and a transmission/reception period in which energy and data are transmitted. As an example, the PB and the station may perform communication through a Wi-Fi module available to perform a local area network wireless communication.

In an embodiment of the present disclosure, the AP 100 utilizes an ACK message including additional information to the existing ACK message to inform a start and an end of the RAW period. The station may not perform data transmission immediately through a contention in the RAW period but notify a current energy state of the station to the AP 100 by transmitting PS-Poll message to the AP 100. When the RAW period is ended, the AP 100 may divide stations into data transmission stations and energy reception stations based on the energy states of the stations and inform the corresponding information to the stations and the PB. The station may perform data transmission and energy reception simultaneously in the later period. Based on the information sent by the AP 100, when a group of stations are on transmitting data, the PB may transmit energy by forming a beam based on a location of station of another group. In addition, the station that is participate in a contention in the RAW process but unable to access a channel is switched to a sleep mode and save energy in the transmission/reception period of data/energy.

Figure 2:
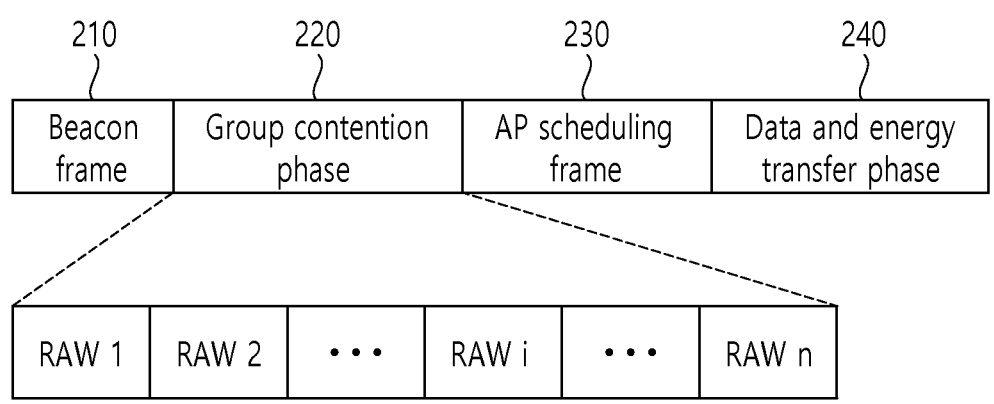
FIG. 2 is a diagram for describing a beacon frame format used in an energy harvesting system according to an embodiment of the present disclosure.

FIG. 2 is a diagram for describing a beacon frame format used in an energy harvesting system according to an embodiment of the present disclosure.

As shown in FIG. 2, a beacon frame format includes a Beacon frame field 210, a Group contention phase field 220, an AP scheduling frame field 230 and a Data and Energy transfer phase field 240. The Group contention phase field 220 includes RAW 1 field, RAW 2 field, . . . , RAW i field, . . . , RAW n field.

The AP allocates n RAWs in which n groups may perform a contention and informs the RAW corresponding to each group through a Beacon frame. Later, the stations in a group perform a channel access through Distributed Coordination Function (DCF) contentions with another station in the corresponding RAW. While the corresponding procedure is performed, the stations in another group operate in a sleep mode to save energy. When the RAW period is ended, the AP determines data transmission stations and energy reception stations based on the energy levels of the stations in each group. The station which has the highest energy may become the data transmission station. All stations except the data transmission station may become energy reception stations. In addition, the AP may restrict the contention success node of each group to n which is identical to the number of groups, in the RAW period to perform a later communication procedure smoothly. After the step of group contention, the AP may determine a transmission order of the data transmission station and the energy reception station to the stations by transmitting AP scheduling frame. In addition, the AP may transmit the AP scheduling frame to the power beacon of each group and inform the determined transmission order of the data transmission station and the energy reception station to the power beacon. The data transmission station of each group transmits data to the AP. The energy reception station of the remaining group may receive energy while the data transmission station transmits data through the beamforming technique from the PB.

Figure 3:
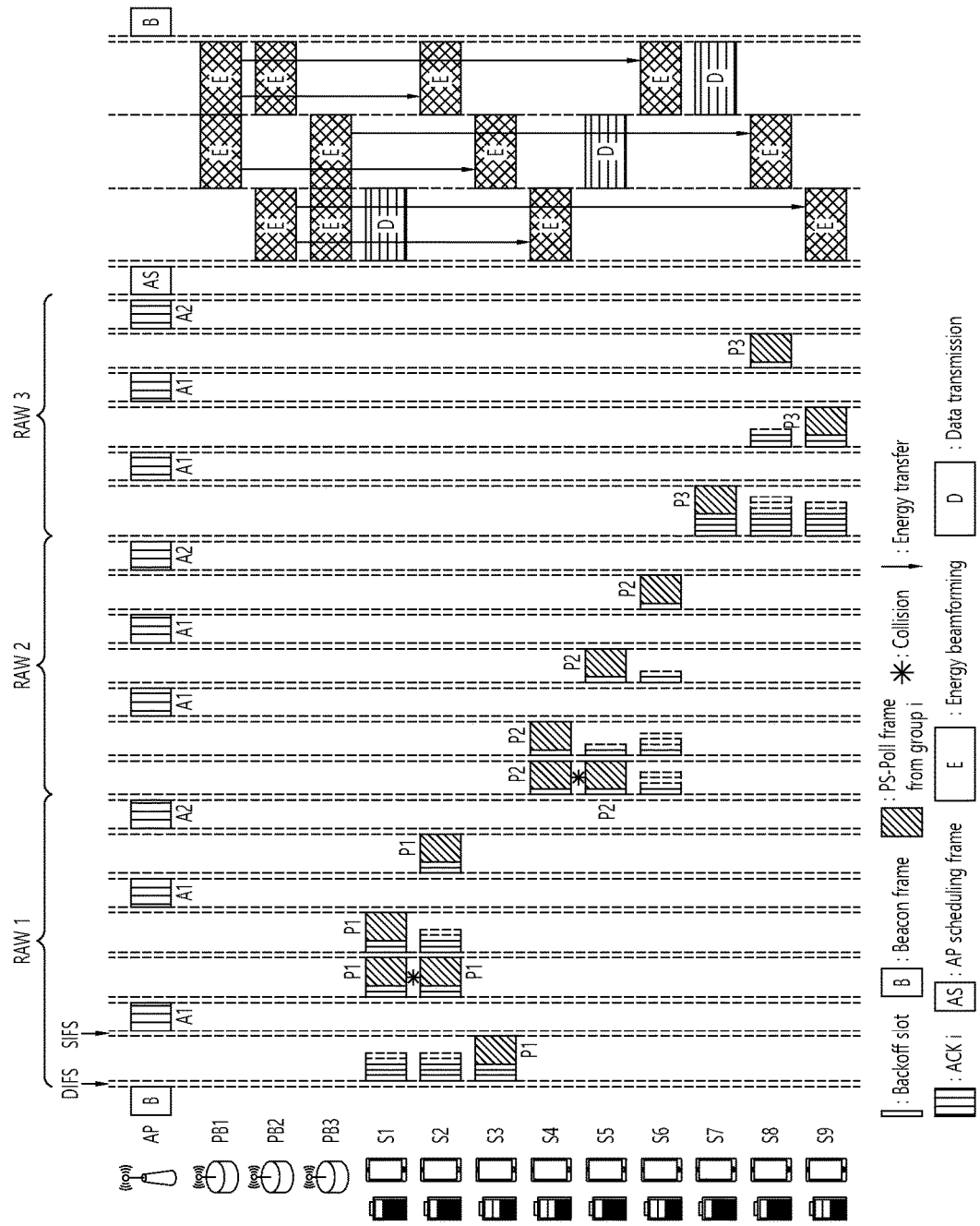
FIG. 3 is a diagram for describing operation processes of an AP, a PB and a station in an energy harvesting system according to an embodiment of the present disclosure.

FIG. 3 is a diagram for describing operation processes of an AP, a PB and a station in an energy harvesting system according to an embodiment of the present disclosure.

The operation process shown in FIG. 3 is described as an example operated in the network shown in FIG. 1. As shown in FIG. 1, group 1 includes PB1, station S1, station S2 and station S3. Group 2 includes PB2, station S4, station S5 and station S6. Group 3 includes PB3, station S7, station S8 and station S9.

First, all stations in group 1 select a backoff value and perform a contention. Station 3 successes a contention between stations and transmits PS-Poll (Power Saving Poll) frame P1 specifying a current energy level to the AP. Here, Pi represents the PS-Poll frame which is a power saving frame transmitted from group i, and i represents a group number.

Later, after a Short Interframe Space (SIFS), the AP transmits ACK1 frame A1 to a station of group 1. Here, Ai represents an Acknowledgement message that the AP transmits to group i, and i represents a group number.

After the DIFS, station S1 and station S2 that are the remaining stations in group 1 perform a contention again. When station S1 and station S2 transmit the PS-Poll frame simultaneously, a collision may occur. When a collision occurs, each station increases a size of Contention Window to double and configures a new backoff value. Through such a contention procedure, a contention is performed until three stations in the next group 2 and group 3 transmit the PS-Poll frame. Later, the AP that receives the third PS-Poll frame P1 transmitted in group 1 transmits ACK2 frame A2 that informs an end of the current RAW. The AP configures the station which has the highest energy level to the data transmission node through ACK2 frame A2. At this time, the other nodes which are not selected are configured as the energy reception nodes. Later, until the contention of all groups including the remaining group 2 and group 3 are completed, the corresponding procedure is repeated.

Meanwhile, the access period $T_1$, which is the first period, a length of the period is determined to total contention times of n groups. The access period, which is the first period of FIG. 3 is a period adding RAW1, RAW2 and RAW3, which are total periods of each RAW. The contention time of each group includes reservation times of n stations. Accordingly, $T_1$ may be represented as Equation 1 below.

$$T_1 = n^2 T_{reserv} \quad \text{[Equation 1]}$$

Herein, $T_1$ represents the access period, which is the first period, n represents the number of stations and $T_{reserv}$ represents the time consumed for a station to reserve a data transmission through a contention.

In the transmission/reception period, which is the second period, the AP transmits the AP scheduling frame AS to all stations to allocate a data transmission order of a group based in the information collected from each group. It may be assumed that a length of data transmission and energy harvesting is fixed identically. When a data transmission is performed in a group, the energy harvesting procedure may be performed in the remaining groups. For example, when station S1 of group 1 transmits data to the AP, PB2 of group 2 and PB3 of group 3 transmit energy to station S4 and station S9, respectively, through the beamforming technique. In addition, when station S5 of group 2 transmits data to the AP, station S3 of group 1 and station S8 of group 3 perform energy harvesting procedure through PB1 and PB3, respectively. Lastly, when station S7 of group 3 transmits data to the AP, station S2 of group 1 and station S6 of group 2 receive energy. As an alternative example, when data transmission is performed in a group, energy transmission is urgently required for the remaining stations of the corresponding group. At this time, through the beamforming technique between the station that requires urgent energy transmission and the PB, in the case that amount of interference with the data transmission is a preconfigured threshold value or less, the data transmission and the energy harvesting may be simultaneously performed. For example, in the case that station S1 of group 1 transmits data to the AP, and PB2 of group 2 and PB3 of group 3 transmit energy to station S4 and station S9, respectively, through the beamforming technique, station S2 or station S3 of group 1 may receive energy from PB1 through the beamforming technique with decreasing interference with the data transmission within a threshold value by station S1.

The transmission/reception period, which is the second period is performed during $T_2$, and a duration of the period when n data are transmitted is as represented in Equation 2 below.

$$T_2 = n^2 T_{data} \quad \text{[Equation 2]}$$

Herein, $T_2$ represents the transmission/reception period, which is the second period, n represents the number of stations and $T_{data}$ represents the time consumed for a station transmits data, that is, the time for transmitting a data frame by a data transmission station. Accordingly, an average beacon period T is represented by sum of a duration $T_1$ of the access period, which is the first period and a duration $T_3$ of the transmission/reception period, which is the second period.

FIGS. 4 to 7 are diagrams for describing PS-Poll, AP scheduling, ACK1 and ACK2 frame formats used in an energy harvesting system according to an embodiment of the present disclosure.

Figure 4:
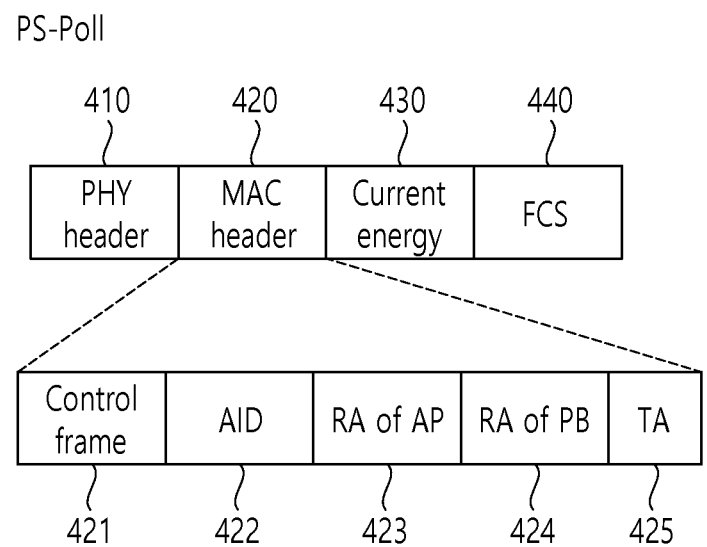
FIGS. 4 to 7 are diagrams for describing PS-Poll, AP scheduling, ACK1 and ACK2 frame formats used in an energy harvesting system according to an embodiment of the present disclosure.

FIG. 4 shows the PS-Poll message format used in the energy harvesting system according to an embodiment of the present disclosure. The PS-Poll message format includes a PHY header field 410, a MAC header field 420, a Current energy field 430 and a Frame Check Sequence field 440. Here, the MAC header field 420 includes a control frame field 421, an AID field 422, a Receiver address (RA) field of AP 423, a Receiver address (RA) field of PB 424 and a Transmitter address (TA) field 425.

Figure 5:
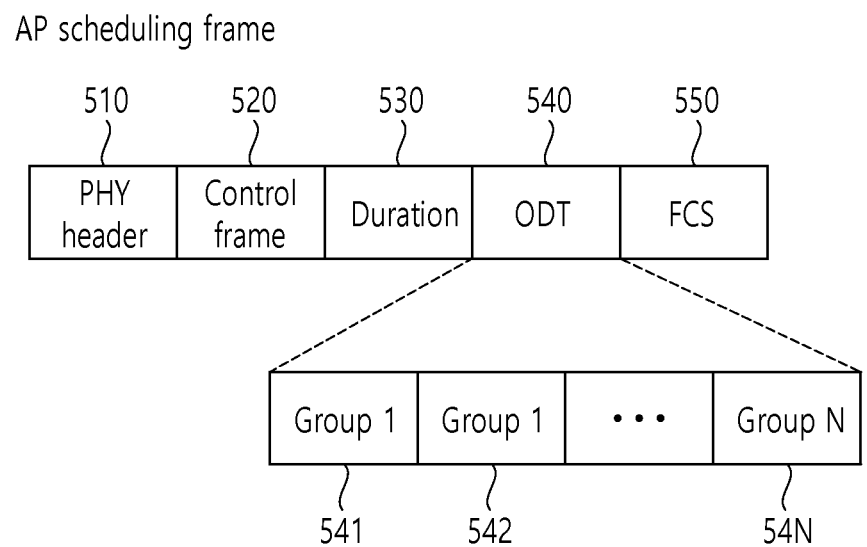

FIG. 5 shows the AP scheduling frame format used in the energy harvesting system according to an embodiment of the present disclosure. The AP scheduling frame format includes a PHY header field 510, a Control frame field 520, a Duration field 530, an ODT field 540 and an FCS field 550. Here, the ODT field 540 includes a group 1 field 541, a group 2 field 542 to a group N field 54N.

Figure 6:
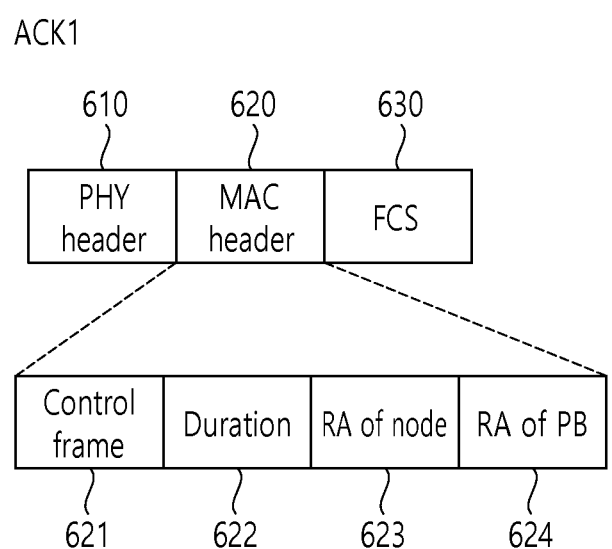

FIG. 6 shows the acknowledgement response ACK1 frame format used in the energy harvesting system according to an embodiment of the present disclosure. The ACK1 frame format includes a PHY header field 610, a MAC header field 620 and an FCS field 630. Here, the MAC header field 620 includes a control frame field 621, a Duration field 622, an RA of node field 623 and an RA of PB field 624.

Figure 7:
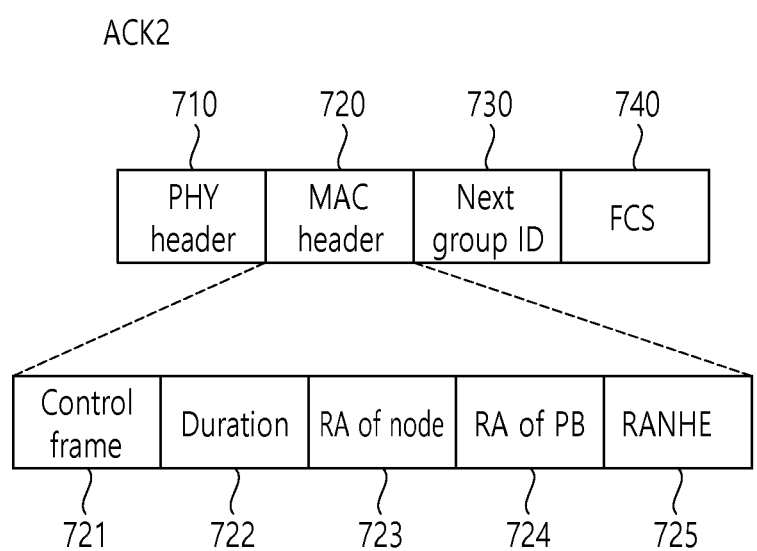

FIG. 7 shows the acknowledgement response ACK2 frame format used in the energy harvesting system according to an embodiment of the present disclosure. The ACK2 frame format includes a PHY header field 710, a MAC header field 720, a Next group ID field 730 and an FCS field 740. Here, the MAC header field 720 includes a control frame field 721, a Duration field 722, an RA of node field 723, an RA of PB field 724 and a Receiver Address of the Node with Highest Energy (RANHE) field 725 representing a receiver address of a node of the highest energy.

As described above, FIG. 4 to FIG. 7 show the PS-Poll, AP scheduling, ACK1 and ACK2 frame formats. A station may inform a Current energy level of the current station through the PS-Poll message by including a group ID in an Association ID (AID) field to an AP. The AID field is designed for informing the group ID to the AP and the PB. The AP that receives the information corresponding to the AID field informs the station with a transmission order by including the group ID in an Order of Data Transmission (ODT) field to the AP scheduling message. Each group includes a data transmission station. The station corresponding to the transmission order transmits data to the AP according to the group ID order specified in the ODT field. The AP needs to transmit ACK1 and ACK2 messages to both station and the PB. Therefore, the ACK1 and ACK2 messages need to include both an address of the station and an address of the PB. In addition, the AP includes the address of station having the highest energy level in the ACK2 message and informs the corresponding station to the stations and the PB of the group. The AP may inform a start of the next contention period by including the group ID to perform the next contention in the ACK2.

Figure 8:
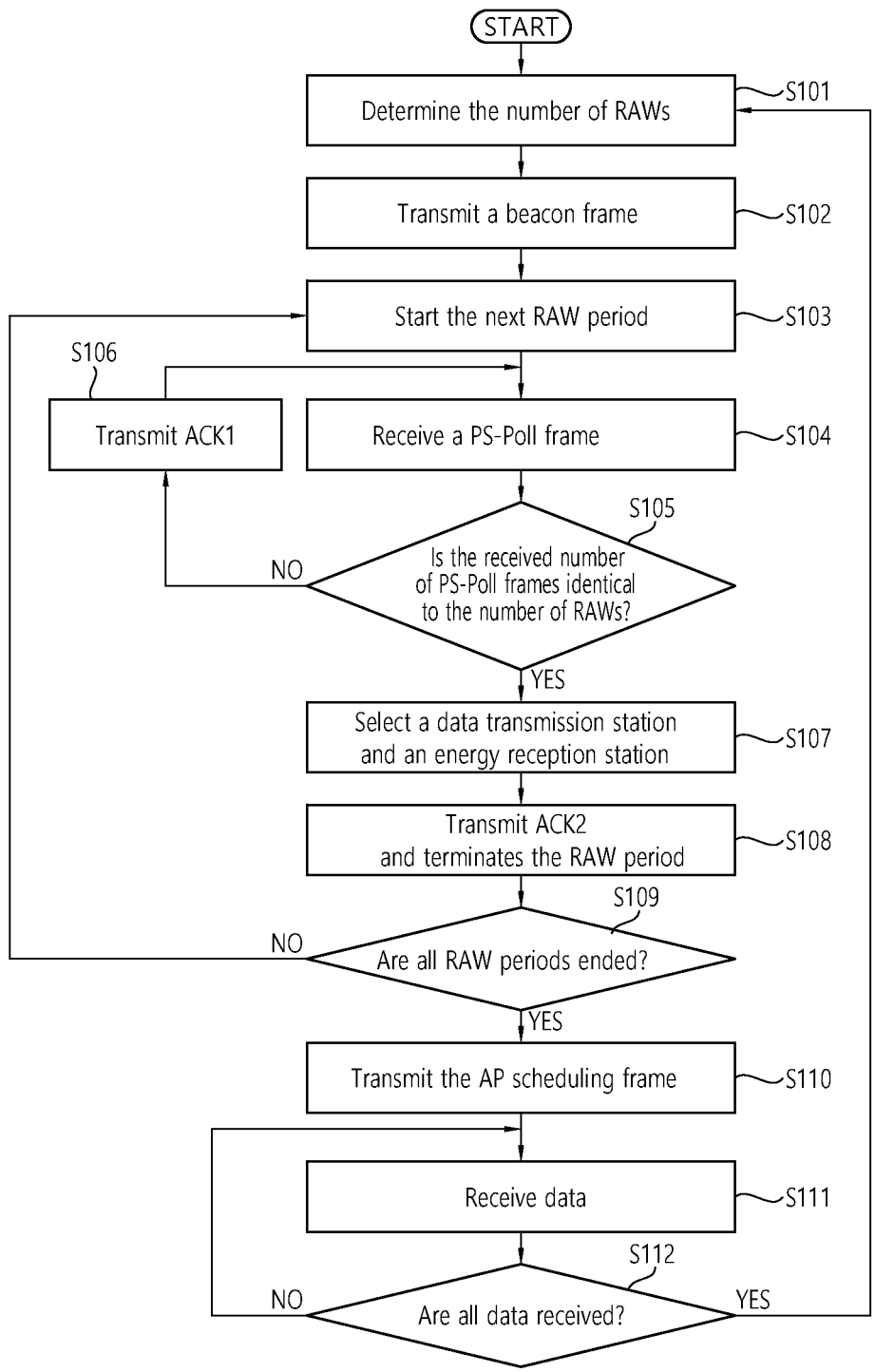
FIG. 8 is a diagram for describing a flow of a group-based energy harvesting method performed in an access point in an energy harvesting system according to an embodiment of the present disclosure.

FIG. 8 is a diagram for describing a flow of a group-based energy harvesting method performed in an access point in an energy harvesting system according to an embodiment of the present disclosure.

In step S101, the access point determines the number of Restricted Access Window (RAW) which is restricted based on the number of groups belonged to the energy harvesting system.

In step S102, the access point transmits a beacon frame to stations and power beacons in each group belonged to the energy harvesting system in a network.

In step S103, the access point starts the next RAW period.

In step S104, the access point receives a PS-Poll frame from a station of group corresponding to the started RAW period.

In step S105, the access point identifies whether the received number of PS-Poll frames is identical to the number of RAWs.

In step S106, the access point transmits ACK1 frame when the received number of PS-Poll frames is not identical to the number of RAWs.

In step S107, when the received number of PS-Poll frames is identical to the number of RAWs, the access point selects a data transmission station and an energy reception station among the stations in the group.

In step S108, the access point transmits the ACK2 message and terminates the RAW period for the corresponding group.

In step S109, the access point checks whether all RAW periods are ended.

In step S110, when all RAW periods are ended, the access point transmits the AP scheduling frame to the PBs and stations in the group. When all RAW periods are not ended, the access point performs step S103 for starting the next RAW period.

In step S111, the access point receives data from the data transmission station selected in step S107 according to the group order included in the scheduling result.

In step S112, the access point checks whether all data are received. The access point performs step S111 until all data are received, and when all data are received, performs steps again from step S101.

Figure 9:
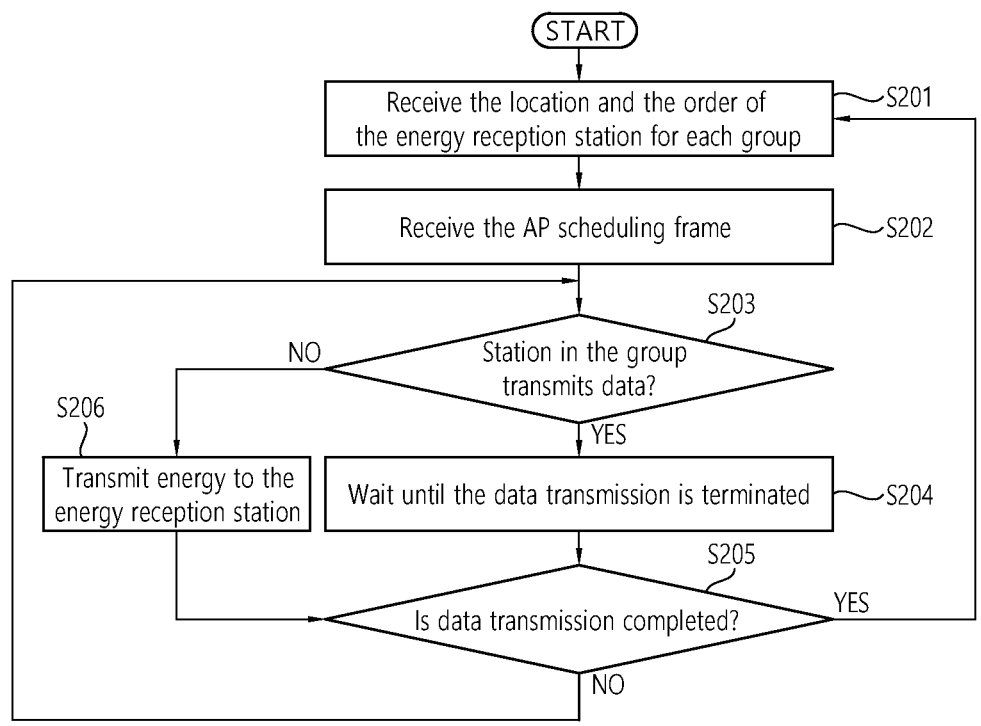
FIG. 9 is a diagram for describing a flow of a group-based energy harvesting method performed in a power beacon in an energy harvesting system according to an embodiment of the present disclosure.

FIG. 9 is a diagram for describing a flow of a group-based energy harvesting method performed in a power beacon in an energy harvesting system according to an embodiment of the present disclosure.

In step S201, the power beacon receives the location and the order of the energy reception station for each group according to the scheduling result performed in the access point from the access point.

In step S202, the power beacon receives the AP scheduling frame from the access point.

In step S203, the power beacon checks whether a data transmission of a station in the group is performed.

In step S204, when the data transmission of a station in the group is performed, the power beacon waits until the data transmission is terminated.

In step S205, the power beacon checks whether the data transmission of a station in the group is terminated. When the data transmission of a station in the group is completed, the beacon performs steps the again from step S201.

Meanwhile, in step S206, when the data transmission of a station in the group is not performed, the power beacon transmits energy to the energy reception station.

Figure 10:
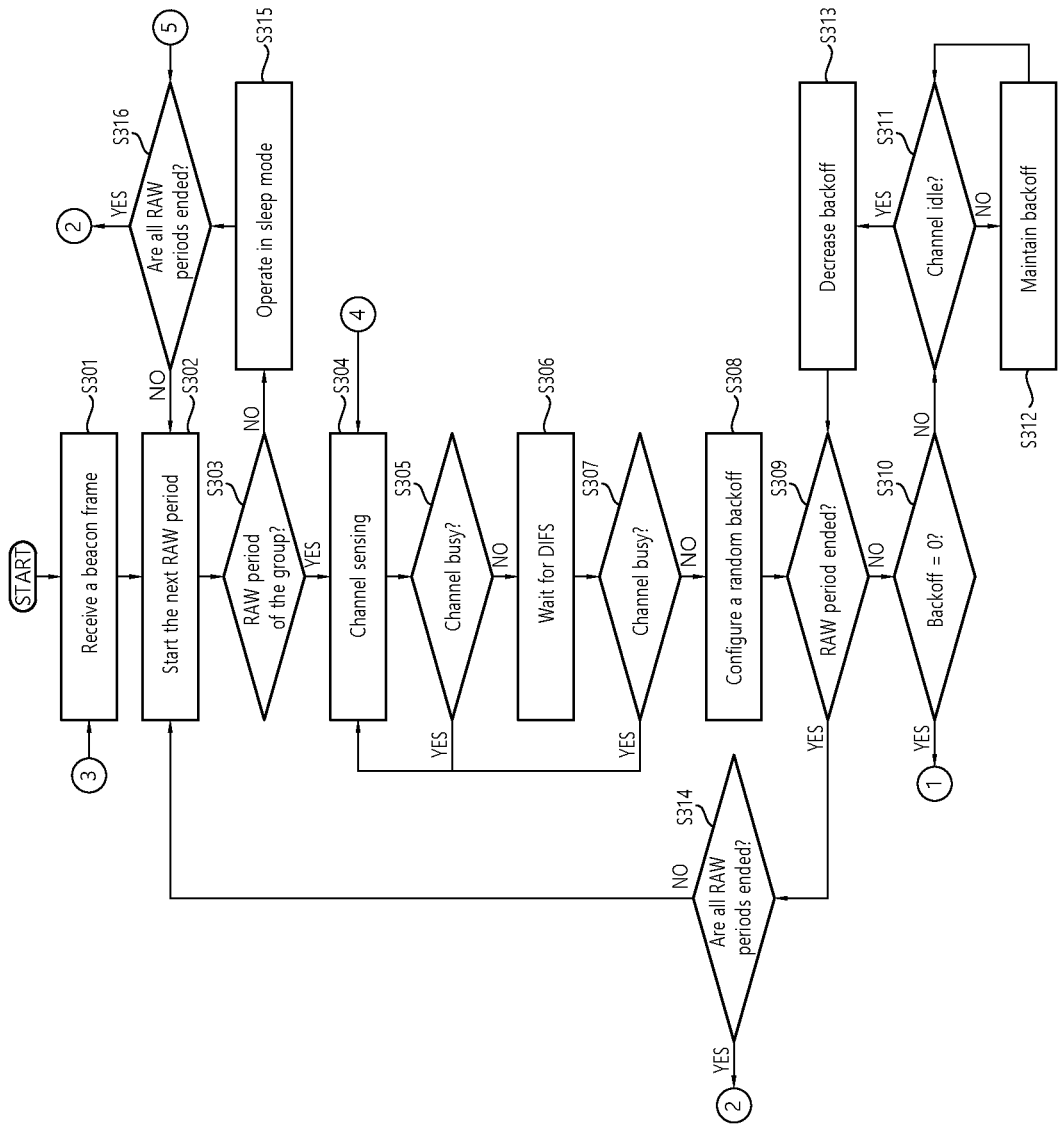
FIGS. 10 to 12 is a diagram for describing a flow of a group-based energy harvesting method performed in a station in an energy harvesting system according to an embodiment of the present disclosure.
Figure 11:
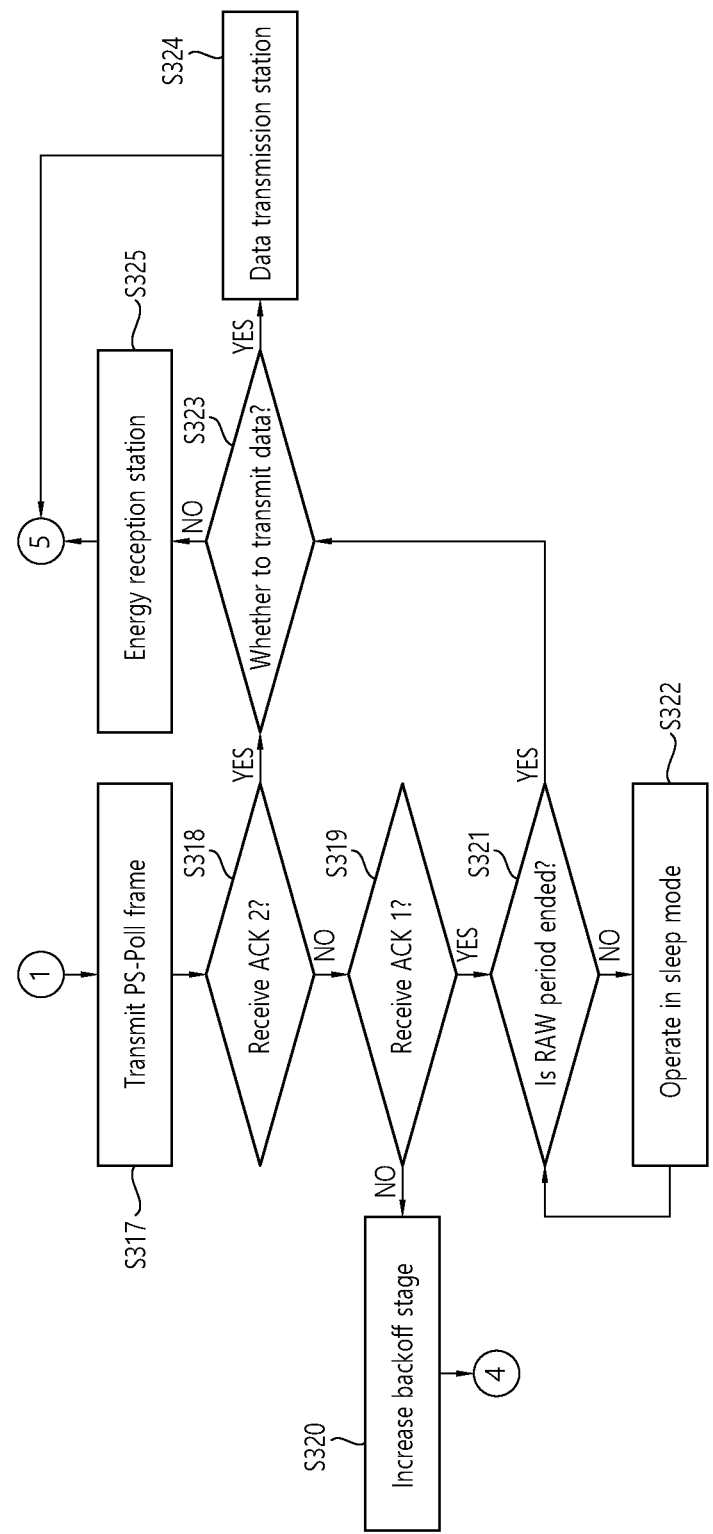
Figure 12:
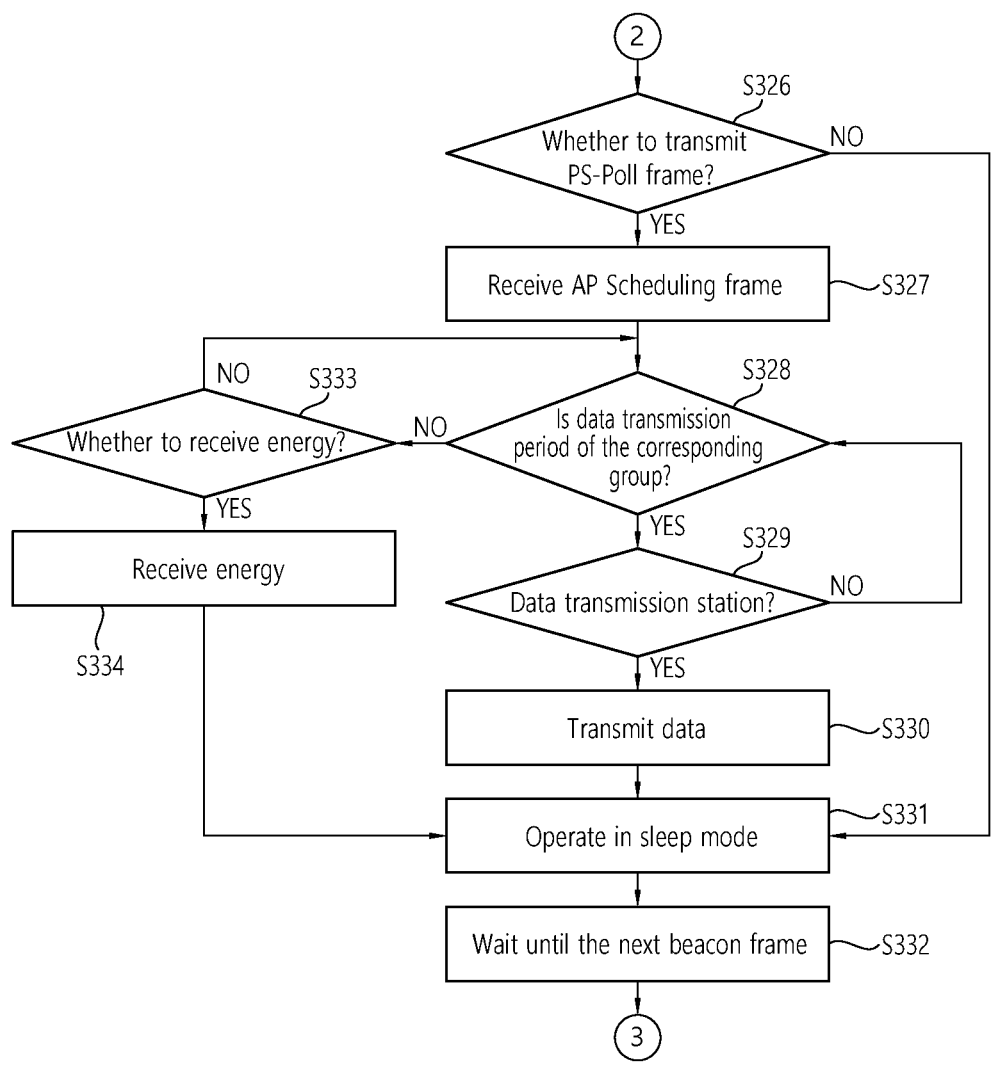

FIGS. 10 to 12 is a diagram for describing a flow of a group-based energy harvesting method performed in a station in an energy harvesting system according to an embodiment of the present disclosure.

First, the relationship of drawings in FIG. 10 to FIG. 12 is indicated by ①, ②③, ④ and ⑤, and each number shows the interrelated flow.

In step S301, the station receives the beacon frame from the access point.

In step S302, the station checks whether the next RAW period is started through the received beacon frame.

In step S303, the station checks whether the RAW period is a RAW period to which the station is belonged.

In step S304, when the RAW period is a RAW period of the corresponding group, the station senses a channel in the group.

In step S305, the station checks whether the channel is busy, that is, the channel is occupied by another station.

In step S306, when the channel is busy, the station waits for the Distributed Interframe Space (DIFS). When the channel is not busy, the station performs step S304.

In step S307, the station checks whether the channel is busy.

In step S308, when the channel is not busy, the station configures a random backoff. When the channel is busy, the station performs step S304.

In step S309, the station checks whether the RAW period is ended.

In step S310, when the RAW period is not ended, the station checks whether backoff is 0.

In step S311, when backoff is not 0, the station checks whether the channel is in an idle state.

In step S312, when the channel is not in an idle state, the station maintains backoff.

In step S313, when the channel is in an idle state, the station decreases backoff and performs step S309.

Later, when backoff of the station becomes 0 by performing step S310, the station performs step S317 of FIG. 11.

Meanwhile, in step S314, when the RAW period is ended, the station checks whether all RAW periods are ended. When all RAW periods are not ended, the station performs step S302. When all RAW periods are ended, the station performs step S326 of FIG. 12.

In step S315, when the RAW period is not a RAW period of the corresponding group, the station operates in a sleep mode.

In step S316, the station checks whether all RAW periods are ended. When all RAW periods are not ended, the station performs step S302. When all RAW periods are ended, the station performs step S326 of FIG. 12.

Hereinafter, description continues with reference to FIG. 11.

In step S317, the station transmits the PS-Poll frame to the access point.

In step S318, the station checks whether the ACK2 frame is received from the access point.

In step S319, when the ACK2 frame is not received from the access point, the station checks whether the ACK1 frame is received.

In step S320, when the ACK1 frame is not received, the station increases backoff stage and performs step S304 of FIG. 10.

In step S321, the station checks whether the RAW period is ended.

In step S322, when the RAW period is not ended, the station operates in a sleep mode until the RAW period is ended and performs step S321.

In step S323, when the RAW period is ended, the station checks whether a data transmission performed for each station.

In step S324, when a data transmission is performed, the station configures the corresponding station as the data transmission station and performs step S316 of FIG. 10.

In step S325, when a data transmission is not performed, the station configures the corresponding station as the energy reception station and performs step S316 of FIG. 10.

Hereinafter, description continues with reference to FIG. 12.

In step S326, the station checks whether the PS-Poll frame is transmitted to the AP.

In step S327, the station that transmits the PS-Poll frame receives the AP scheduling frame from the AP.

In step S328, when the station receives the AP scheduling frame, the station checks whether it is in a data transmission period of the corresponding group.

In step S329, when it is in a data transmission period of the corresponding group, the station checks whether the station is a data transmission station.

In step S330, when the station is a data transmission station, the station performs a data transmission. When the station is not a data transmission station, the station performs step S328.

In step S331, the station operates in a sleep mode after the data transmission.

In step S332, the station waits until the next beacon frame is transmitted and performs step S301 of FIG. 10.

Meanwhile, in step S333, when it is in a data transmission period of the corresponding group, the station checks whether to receive energy.

In step S334, when the station receives energy, that is, the station is an energy reception station, the station receives energy. After the energy reception is completed, the station performs step S331.

Figure 13:
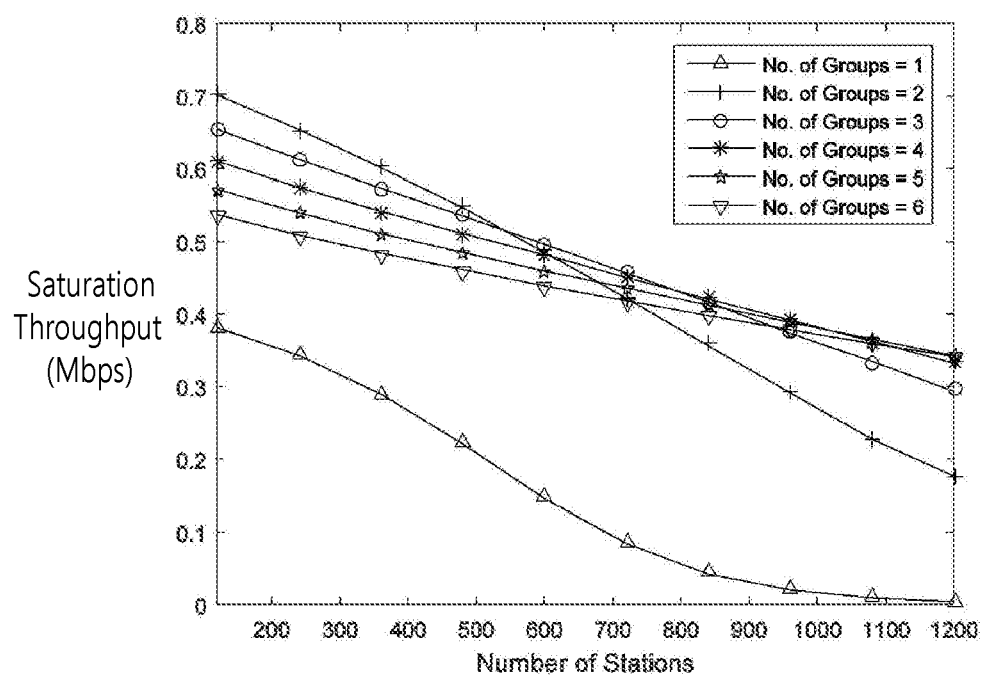
FIG. 13 is a diagram for describing a data throughput performance according to a change of the number of stations in an energy harvesting system according to an embodiment of the present disclosure.

FIG. 13 is a diagram for describing a data throughput performance according to a change of the number of stations in an energy harvesting system according to an embodiment of the present disclosure.

The conventional scheme considers the case of a single group, that is, an M2M network including a single AP and a single PB. In the conventional scheme, owing to the interference between data transmission and energy transmission, simultaneous energy/data transmission is impossible.

FIG. 13 is a graph illustrating data throughput performance according to a change of the number of stations. As the number of stations increases, the probability of collision being occurred increases, and accordingly, data throughput decreases. However, according to the energy harvesting system according to an embodiment of the present disclosure, the probability of collision being occurred is lower than that of the conventional scheme, and higher data throughput is performed than that of the conventional scheme. In the network according to an embodiment of the present disclosure, when the number of groups increases, the probability of collision being occurred decreases, but the opportunity to harvest energy may also be decreased. The energy transfer chance is increased by ½ when the number of groups is 2, increased by ⅔ when the number of groups is 3, and increased by ¾ when the number of groups is 4. When the number of stations is small, since the energy transfer chance influences on the performance more than the collision probability, as the number of groups decreases, the data throughput increases. However, when number of stations increases, since the collision probability increases in the network having small number of groups, delay time increases, and the data throughput decreases significantly. Accordingly, there is a disadvantage that the collision probability increases as the number of stations increase, whereas the opportunity of station to transmit data increases as the number of groups decreases. Therefore, in the M2M network including multiple stations, it is required to divide the stations in more groups.

Figure 14:
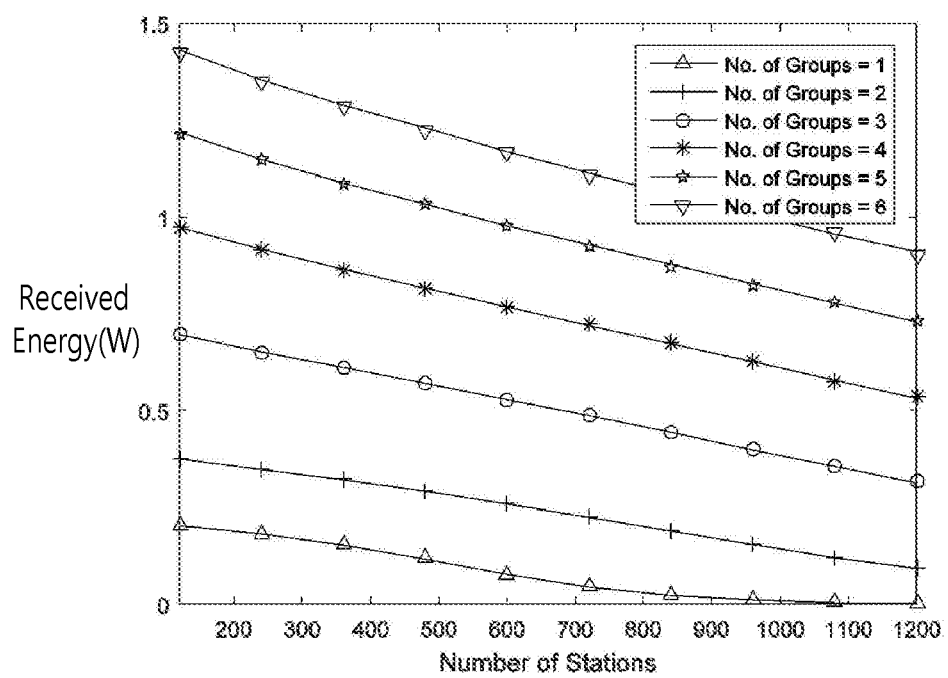
FIG. 14 is a diagram for describing energy received per second according to a change of the number of stations in an energy harvesting system according to an embodiment of the present disclosure.

FIG. 14 is a diagram for describing energy received per second according to a change of the number of stations in an energy harvesting system according to an embodiment of the present disclosure.

FIG. 14 is a graph illustrating energy received per second according to a change of the number of stations. In the energy harvesting system according to an embodiment of the present disclosure, as the number of groups increases, the period of transmitting data increases. Therefore, a station may harvest more energy. According to an embodiment of the present disclosure, in multiple M2M networks, a communication is performed by dividing stations into a group, data throughput is increased, which may be applied to the scenario that multiple stations access a channel. Since RF energy harvesting efficiency utilizing beamforming technique increases as the number of groups increase, which may be applied to the scenario that requires perpetual network maintenance.

FIG. 15 is a diagram for describing a simulation parameter used for simulating an energy harvesting system according to an embodiment of the present disclosure.

In a network, the number of groups is set to 1 to 6 to the maximum. The simulation parameter utilized in the simulation is represented in Table 1 shown in FIG. 15.

The parameters used in an embodiment of the present disclosure are as described below in detail. A minimum contention window CWmin may be set to 31, a maximum contention window CWmax may be set to 255, a Packet Payload may be set to 8148 bits, a MAC header may be set to 272 bits, a PHY Header may be set to 128 bits, a PS-Poll Frame size may be set to 288 bits, an ACK Frame size may be set to 240 bits, a Slot Duration may be set to 28 μs, a Propagation Delay may be set to 1 μs, an SIFS may be set to 28 μs, a DIFS may be set to 128 μs, an ACK Timeout may be set to 300 μs, a Channel Rate may be set to 1 Mbps, a Beacon Message size may be set to 200 bits, an AP Scheduling Frame Size may be set to 200 bits, a Battery Capacity may be set to 1 J, a TX Power may be set to 100 mW, a RX Power may be set to 60 mW and a Beamforming power may be set to 500 mW.

Figure 16:
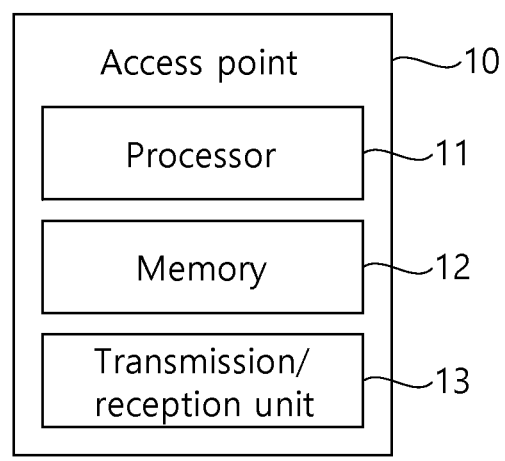
FIG. 16 is a configuration diagram for describing a configuration of an access point in an energy harvesting system according to an embodiment of the present disclosure.

FIG. 16 is a configuration diagram for describing a configuration of an access point in an energy harvesting system according to an embodiment of the present disclosure.

As shown in FIG. 16, the access point 10 of the energy harvesting system according to an embodiment of the present disclosure may include a processor 11, a memory 12 and a transmission/reception unit 13. However, not all constituent elements shown in the drawing are essential elements. The access point 10 may be implemented by more constituent elements than the constituent elements shown in the drawing, or the access point 10 may be implemented by less constituent elements than the constituent elements shown in the drawing.

Hereinafter, the detailed configuration and operation of each elements of the access point 10 of FIG. 16 are described.

The memory 12 stores data. The memory 12 may store data transmitted and received in the access point 10. The memory 12 may store data which is generated or processed in the access point 10.

The transmission/reception unit 13 transmits and receives a wireless signal. The transmission/reception unit 13 may communicate with each group but communicate with a PB or a station in the group.

The processor 11 is connected to the memory 12 and the transmission/reception unit 13.

The processor 11 allocates an access period in each group including at least one station, receives an energy state from the station in the group corresponding to the access period allocated through the transmission/reception unit 13 and schedules stations in each group as a data transmission station or an energy reception station based on the received energy state.

The processor 11 may receive data from a data transmission station of any one group through the transmission/reception unit 13 in a transmission/reception period after the allocated access period.

The processor 11 may schedule the station which has the highest energy as the data transmission station based on the received energy state.

The processor 11 may transmit a scheduling order of stations of each group to stations of each group and a power beacon.

The processor 11 may include a group identity in a data transmission order field of a scheduling frame and inform the data transmission order to the stations of each group and the power beacon.

Here, an average period of the beacon frame broadcasted by the access point may be a sum of the duration of the access period and the duration of the transmission/reception period.

The processor 11 may include an address of station of each group and an address of the power beacon of each group in an acknowledgement response message and transmit it to the stations of each group.

Figure 17:
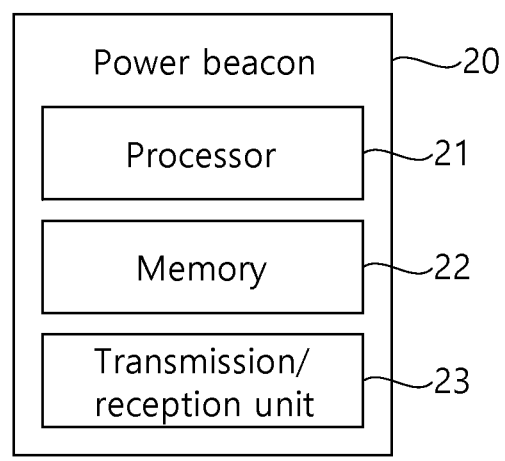
FIG. 17 is a configuration diagram for describing a configuration of a power beacon in an energy harvesting system according to an embodiment of the present disclosure.

FIG. 17 is a configuration diagram for describing a configuration of a power beacon in an energy harvesting system according to an embodiment of the present disclosure.

As shown in FIG. 17, the power beacon 20 of the energy harvesting system according to an embodiment of the present disclosure may include a processor 21, a memory 22 and a transmission/reception unit 23. However, not all constituent elements shown in the drawing are essential elements. The power beacon 20 may be implemented by more constituent elements than the constituent elements shown in the drawing, or the power beacon 20 may be implemented by less constituent elements than the constituent elements shown in the drawing.

Hereinafter, the detailed configuration and operation of each elements of the power beacon 20 of FIG. 17 are described.

The memory 22 stores data. The memory 22 may store data transmitted and received in the power beacon 20. The memory 22 may store data which is generated or processed in the power beacon 20.

The transmission/reception unit 23 transmits and receives a wireless signal. The transmission/reception unit 23 may transmit/receive a wireless signal with the access point 10 or transmit energy through a wireless signal to the stations in a group.

The processor 21 is connected to the memory 22 and the transmission/reception unit 23.

The processor 21 receives a scheduling result for a station in the group from the access point 10 and transmits energy to an energy reception station determined according to the scheduling result through the transmission/reception unit 23 in a transmission/reception period after the access period allocated by the access point 10.

The processor 21 may wait for an energy transmission during a data transmission of the data transmission station in the group in which the power beacon 20 is located.

The processor 21 may transmit energy to the energy reception station using beamforming based on the position of the energy reception station through the transmission/reception unit 23.

Figure 18:
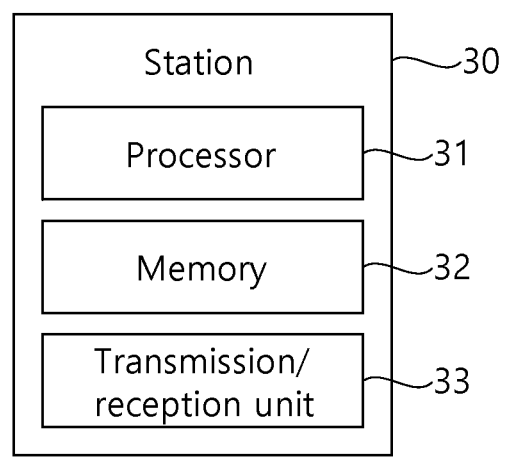
FIG. 18 is a configuration diagram for describing a configuration of a station in an energy harvesting system according to an embodiment of the present disclosure.

FIG. 18 is a configuration diagram for describing a configuration of a station in an energy harvesting system according to an embodiment of the present disclosure.

As shown in FIG. 18, the station 30 of the energy harvesting system according to an embodiment of the present disclosure may include a processor 31, a memory 32 and a transmission/reception unit 33. However, not all constituent elements shown in the drawing are essential elements. The station 30 may be implemented by more constituent elements than the constituent elements shown in the drawing, or the station 30 may be implemented by less constituent elements than the constituent elements shown in the drawing.

Hereinafter, the detailed configuration and operation of each elements of the station 30 of FIG. 18 are described.

The memory 32 stores data. The memory 32 may store data transmitted and received in the station 30. The memory 32 may store data which is generated or processed in the station 30.

The transmission/reception unit 33 transmits and receives a wireless signal. The transmission/reception unit 33 may transmit/receive a wireless signal with the access point 10 or the power beacon 20 or transmit/receive a wireless signal with another station in the group.

The processor 31 is connected to the memory 32 and the transmission/reception unit 33.

The processor 31 transmits an energy state of the station to the access point 10 in the access period, receives a scheduling result for the station from the access point 10 and transmits data to the access point according to the scheduling result or receives energy from the power beacon 20 of the group in a transmission/reception period after the access period.

The processor 31 may transmit the energy state through a contention between stations of the group in an allocated access period to the power beacon 20 and the access point 10.

When a channel access is failed in the contention between stations of each group corresponding to the allocated access period, the processor 31 may be switched to a sleep mode until the next beacon frame is received.

Here, the number of stations that succeeds in the contention between stations may be restricted to the number of entire groups or less.

The processor 31 may be switched to a sleep mode while the contention between stations of different groups is performed.

In the transmission/reception period, a data transmission time for transmitting by a data transmission station and an energy reception time for receiving by an energy reception station may be identically configured.

When the station is determined to be the data transmission station in the transmission/reception period, the processor 31 may transmit data to the access point according to a group identity order indicated in the data transmission order field.

The method according to the embodiments of the present disclosure described above may be implemented with codes readable by a computer in a computer-readable recording medium. The method according to the embodiments of the present disclosure may be implemented with a computer program command form which can be executed through various computing means and stored in a computer-readable recording medium.

A computer-readable recording medium in which program for executing a group-based energy harvesting method in a computer, which is performed by an access point in an energy harvesting system according to the embodiments of the present disclosure may include allocating an access period in each group including at least one station; receiving an energy state from the station in the group corresponding to the allocated access period; and scheduling stations in each group as a data transmission station or an energy reception station based on the received energy state.

A computer-readable recording medium in which program for executing a group-based energy harvesting method in a computer, which is performed by a power beacon in an energy harvesting system according to the embodiments of the present disclosure may include receiving a scheduling result for a station in a group from an access point; and transmitting energy to an energy reception station determined according to the scheduling result in a transmission/reception period after an access period allocated by the access point.

A computer-readable recording medium in which program for executing a group-based energy harvesting method in a computer, which is performed by a station in an energy harvesting system according to the embodiments of the present disclosure may include transmitting an energy state of the station to an access point in an access period; receiving a scheduling result for the station from the access point; and receiving energy from the power beacon of a group or transmitting data to the access point according to a scheduling result in a transmission/reception period after the access period.

The computer-readable recording medium includes all kinds of recording media storing data which can be interpreted by a computer system. For example, the computer-readable recording medium may include a Read Only Memory (ROM), a Random-Access Memory (RAM), a magnetic tape, a magnetic disk, a flash memory, an optical data storage device, and the like. In addition, the computer-readable recording medium may be distributed in computer systems connected to a computer network and may be stored and executed as a code readable in a distribution manner.

While the present disclosure has been described with reference to the accompanying drawings and exemplary embodiments, it is to be understood that the disclosure is not limited by the accompanying drawings and embodiments. It will be understood by those skilled in the art that various changes in form and details may be made therein without departing from the spirit and scope of the disclosure as defined by the appended claims.

In particular, the described features may be implemented within digital electronic circuitry, or computer hardware, firmware, or combinations thereof. The features may be implemented in a computer program product embodied in a storage device in a machine-readable storage device, for example, for execution by a programmable processor. Also, the features may be performed by a programmable processor executing a program of instructions for performing functions of the described embodiments, by operating on input data and generating an output. The described features may be implemented in at least one computer programs that can be executed on a programmable system including at least one programmable processor, at least one input device, and at least one output device which are combined to receive data and directives from a data storage system and to transmit data and directives to the data storage system. A computer program includes a set of directives that can be used directly or indirectly within a computer to perform a particular operation on a certain result. A computer program may be written in any form of programming language including compiled or interpreted languages and may be used in any form included as modules, elements, subroutines, or other units suitable for use in other computer environments or independently operable programs.

Suitable processors for execution of the program of directives include, for example, both general-purpose and special-purpose microprocessors, and a single processor or one of multiple processors of other type of computer. In addition, storage devices suitable for implementing the computer program directives and data implementing the described features include, for example, semiconductor memory devices such as EPROM, EEPROM, and flash memory devices, magnetic devices such as internal hard disks and removable disks, magneto-optical disks, and all forms of nonvolatile memories including CD-ROM and DVD-ROM disks. The processor and memory may be integrated within Application-Specific Integrated Circuits (ASICs) or added by ASICs.

While the present disclosure has been described on the basis of a series of functional blocks, it is not limited by the embodiments described above and the accompanying drawings and it will be apparent to those skilled in the art that various substitutions, modifications and variations can be made without departing from the scope of the present disclosure.

The combination of the above-described embodiments is not limited to the above-described embodiments, and various forms of combination in addition to the above-described embodiments may be provided according to implementation and/or necessity.

In the above-described embodiments, the methods are described on the basis of a flowchart as a series of operations or blocks, but the present disclosure is not limited to the order of the operations, and some operations may occur in different orders or at the same time unlike those described above. It will also be understood by those skilled in the art that the operations shown in the flowchart are not exclusive, and other operations may be included, or one or more operations in the flowchart may be omitted without affecting the scope of the present disclosure.

The above-described embodiments include examples of various aspects. While it is not possible to describe every possible combination for expressing various aspects, one of ordinary skill in the art will recognize that other combinations are possible. Accordingly, it is intended that the present disclosure include all alternatives, modifications and variations that fall within the scope of the following claims.

So far, the present disclosure is described with reference to drawings and embodiments. However, it is understood that the scope of the present disclosure is not limited to the drawings and the embodiments, and those skilled in the art may modify and change the present disclosure in various ways within the scope not departing from the concept and the scope of the present disclosure written in the following claims.

What is claimed is:

1. A group-based energy harvesting method performed by an access point in an energy harvesting system, the method comprising:
    allocating an access period in each group including at least one station;
    receiving an energy state from a station included in each group; and
    scheduling the station included in each group as a data transmission station or an energy reception station based on the received energy state,
    wherein a total number of groups is determined based on a number of power beacons in the energy harvesting system, and each group comprises a power beacon and at least one station located within a communication range of the power beacon.

2. The group-based energy harvesting method of claim 1, further comprising:
    receiving data from a data transmission station of any one group in a transmission/reception period after the allocated access period.

3. The group-based energy harvesting method of claim 1, wherein the scheduling of the station in each group includes:
    scheduling a station which has a highest energy as the data transmission station based on the received energy state.

4. The group-based energy harvesting method of claim 1, further comprising:
    transmitting a scheduling order of stations of each group to stations of each group and a power beacon.

5. The group-based energy harvesting method of claim 4, wherein the transmitting of the scheduling order includes:
    including a group identity in a data transmission order field of a scheduling frame and informing the data transmission order to the stations of each group and the power beacon.

6. The group-based energy harvesting method of claim 1, wherein an average period of a beacon frame broadcasted by the access point is a sum of a duration of the access period and a duration of a transmission/reception period.

7. The group-based energy harvesting method of claim 1, further comprising:
    transmitting an acknowledgement response message with an address of station of each group and an address of the power beacon of each group being included to the stations of each group.

8. A group-based energy harvesting method performed by a power beacon in an energy harvesting system, the method comprising:
    receiving a scheduling result for a station in a group from an access point; and
    transmitting energy to an energy reception station determined in the group according to the scheduling result in a transmission/reception period after an access period allocated by the access point,
    wherein a total number of groups is determined based on a number of power beacons in the energy harvesting system, and each group comprises a power beacon and at least one station located within a communication range of the power beacon.

9. The group-based energy harvesting method of claim 8, further comprising:
    waiting for an energy transmission during a data transmission of a data transmission station in the group in which the power beacon is located.

10. The group-based energy harvesting method of claim 8, wherein the transmitting of the energy includes:
    transmitting energy to the energy reception station using beamforming based on a position of the energy reception station.

11. A group-based energy harvesting method performed by a station in an energy harvesting system, the method comprising:
    transmitting an energy state of the station included in a group to an access point in an access period, wherein a total number of groups is determined based on a number of power beacons in the energy harvesting system, and each group comprises a power beacon and at least one station located within a communication range of the power beacon;
    receiving a scheduling result for the station from the access point; and
    receiving energy from the power beacon included in each group or transmitting data to the access point according to the scheduling result in a transmission/reception period after the access period.

12. The group-based energy harvesting method of claim 11, wherein the transmitting of the energy state includes:
    transmitting the energy state and beacon information of the power beacon in the corresponding group through a contention between stations of the group in the access period.

13. The group-based energy harvesting method of claim 11, further comprising:
    when a channel access is failed in the contention between stations of each group corresponding to the access period, being switched to a sleep mode until a next beacon frame is received.

14. The group-based energy harvesting method of claim 11, wherein a number of stations that succeeds in the contention between stations is restricted to a number of entire groups or less.

15. The group-based energy harvesting method of claim 11, further comprising:
    being switched to a sleep mode while the contention between stations of different groups is performed.

16. The group-based energy harvesting method of claim 11, wherein a data transmission time for transmitting by a data transmission station and an energy reception time for receiving by an energy reception station are identically configured in the transmission/reception period.

17. The group-based energy harvesting method of claim 11, wherein the transmitting of the data includes:
when the station is determined to be the data transmission station in the transmission/reception period, transmitting data to the access point according to a group identity order indicated in a data transmission order field.

18. An access point in an energy harvesting system, comprising:
a memory configured to store data;
a transmission/reception unit configured to transmit/receive a wireless signal; and
a processor connected to the memory and the transmission/reception unit,
wherein the processor is configured to:
allocate an access period in each group including at least one station,
receive an energy state from a station included in each group, and
schedule the station included in each group as a data transmission station or an energy reception station based on the received energy state,
wherein a total number of groups is determined based on a number of power beacons in the energy harvesting system, and each group comprises a power beacon and at least one station located within a communication range of the power beacon.

19. A power beacon in an energy harvesting system, comprising:
a memory configured to store data;
a transmission/reception unit configured to transmit/receive a wireless signal; and
a processor connected to the memory and the transmission/reception unit,
wherein the processor is configured to:
receive a scheduling result for a station in a group from an access point, and
transmit energy to an energy reception station determined according to the scheduling result in a transmission/reception period after an access period allocated by the access point,
wherein a total number of groups is determined based on a number of power beacons in the energy harvesting system, and each group comprises the power beacon and at least one station located within a communication range of the power beacon.

20. A station in an energy harvesting system, comprising:
a memory configured to store data;
a transmission/reception unit configured to transmit/receive a wireless signal; and
a processor connected to the memory and the transmission/reception unit,
wherein the processor is configured to:
transmit an energy state of the station included in a group to an access point in an access period, wherein a total number of groups is determined based on a number of power beacons in the energy harvesting system, and each group comprises a power beacon and at least one station located within a communication range of the power beacon,
receive a scheduling result for the station from the access point, and
receive energy from the power beacon included in each group or transmit data to the access point according to the scheduling result in a transmission/reception period after the access period.

* * * * *